Patented Dec. 12, 1939

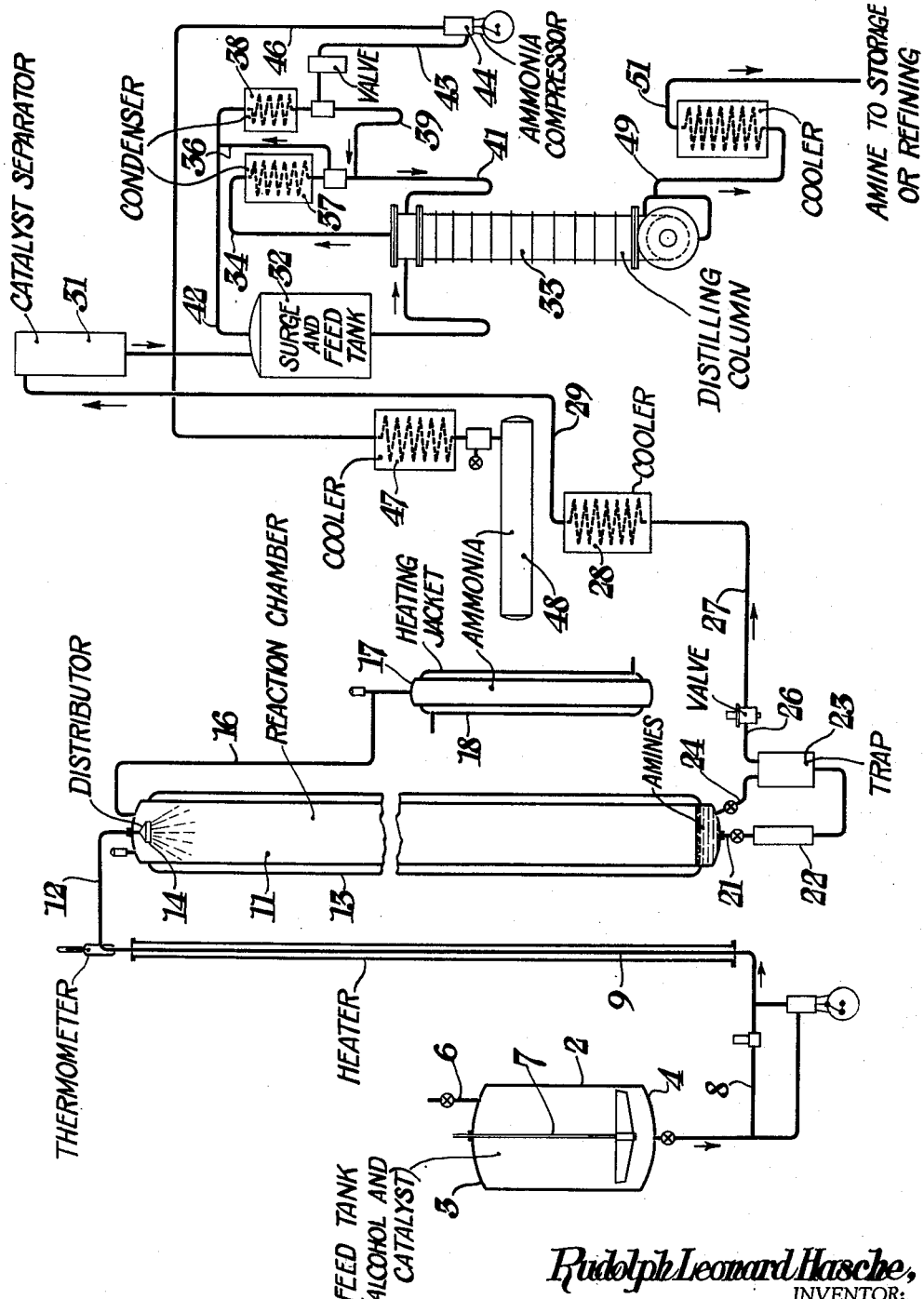

2,182,807

UNITED STATES PATENT OFFICE 2,182,807

PROCESS FOR THE PRODUCTION OF AMINES

Rudolph Leonard Hasche, Kingsport, Tenn., assignor to Eastman Kodak Company, Rochester, N. Y., a corporation of New Jersey Application September 5, 1936, Serial No. 99,591

9 Claims. (Cl. 260—585)

This invention relates to the manufacture of amines and more particularly to the manufacture of aliphatic amines containing 3 to 5 carbon atoms.

Amines are well-known chemical compounds which are used for various purposes such as chemical intermediates, photographic purposes, refrigerants, dyes, and in the gasoline, oil and tanning industries as well as various other industries. One way of manufacturing amine comprises passing alcohol and ammonia vapors over a highly heated catalyst. Other processes involve agitation of ammonia with the compound to be aminated in order to cause reaction. The processes of the prior art in many instances produce large quantities of tertiary amines and other less useful or undesired compounds.

I have found a simple and efficient method for reacting materials capable of amination with an aminating agent which produces large yields of primary amines without the attendant production of large quantities of tertiary amines or other less useful or undesired materials.

This invention has for an object to provide a process for producing amines and in particular, aliphatic amines of from 3 to 5 carbon atoms. A further object is to provide a simple and efficient process for the production of primary amines and in particular, normal butyl amine. A still further object is to provide a process for the production of amines wherein the formation of tertiary amines and other less desirable products is eliminated or kept to a minimum. Another object is to provide a catalytic process for the production of aliphatic amines. Still another object is to provide a high pressure process for the production of aliphatic amines which is continuous. A still further object is to provide a process of amination in which at least a part of the components are treated in the liquid phase. Other objects will appear hereinafter.

These objects are accomplished by the following invention in which I have found that in reactions for the manufacture of amines, greatly improved results can be obtained by dispersing the material to be aminated in the form of fine droplets or in thin films in an atmosphere of the aminating agent.

For a more complete understanding of my invention, reference is made to the attached drawing forming a part of the present application.

Fig. 1 is a semi-diagrammatic side elevation view of apparatus arrangement for carrying out my invention. Certain parts thereof are shown in section or on an exaggerated scale for clarity.

In Fig. 1, 2 designates a tank or storage vessel. The tank may be cylindrical or of other construction and include the head 3 and the base 4. The head will be provided with inlet conduit 6. Also, a stirring or agitating mechanism 7 may extend into the tank through the head. The base of the tank, which may be of cone-shape or otherwise constructed producing a sump, is connected with the valved draw-off conduit 8.

Tank 2 may be positioned so that its contents will be pumped through a heater or heat exchanger 9. Heat exchanger 9 may be of any suitable construction and may merely comprise steam-jacketed conduit 8, 12 for a portion of the length thereof.

The reaction chamber 11 in accordance with the embodiment shown is preferably relatively elongated. The chamber is enclosed by a temperature controlling jacket 13. By virtue of elongated construction a greater reaction path is obtained. Also, the temperature within the interior of the chamber may be better controlled by means of circulating fluid in the external jacket. The chamber is of such a construction as to withstand pressures which may amount to as high as 2 or 3 thousand pounds per square inch. The chamber may be filled with packing material or other devices for breaking up the flow of the contents, although we have found that in the case where a finely divided suspended catalyst was used better results were obtained with an unpacked chamber. In the upper portion of reaction chamber 11 a spray or diffuser head 14 is provided and connected with conduit 12.

Also leading to the upper portion of the reaction tower is another conduit 16, which is connected to supply cylinder 17. This cylinder 17 is also constructed to withstand high internal pressures and contains the liquid aminating agent. The cylinder is equipped with a temperature controlling jacket 18, whereby constant high pressures may be produced in the system by suitably heating the aminating agent contained in chamber 17. In place of a temperature controlling jacket, it is possible to employ steam coils or other similar construction inserted into chamber 17 for heating the contents thereof. Preferably, conduit 16 is connected with the upper portion of reaction chamber 11 in order to prevent losses of agent as the amines produced are withdrawn from the lower portion of the reaction chamber.

The lower portion of the reaction chamber 11 is connected by valved conduit 21 to a trap system designated 22, 23, and 24. This trap system may have attached thereto heating devices so that it may be maintained at a temperature higher than the critical temperature of ammonia. By means of this construction the liquid contents of the reaction chamber may be removed therefrom without carrying out large quantities of ammonia. Or, in place of the trap construction, various liquid level controllers which are known may be employed.

The aforementioned construction is connected by conduits 26 and 27 through pressure-reducing valves to a cooler or other heat exchange construction designated 28. Conduit 29 is provided for conducting the contents from cooler 28 to feed or storage tank 32 for column 33. Somewhere along line 29 may be inserted device 31 such as a centrifuge, filter, decanter or other type of construction for removing catalyst.

Column 33 may be of any usual construction suitable for flashing off ammonia. The upper portion of the column will be connected through vapor outlet conduits 34 and 36 to the several condensers 37, 38. Several reflux lines 39 and 41 will be provided. The last condenser may be connected by conduit 42 back to feed or through conduit 43, compresser 44, conduit 46 and cooler 47 to storage cylinder 48.

The lower portion of column 33 is provided with heating means as usual. The base of the column is connected by a draw-off conduit 49 which may lead through conduit 51 to storage, refining or other apparatus.

The operation of my apparatus as well as the operation of my novel process for producing amines will be better understood by consideration of the following example, which is set forth merely for the purposes of illustration. As an example, I describe the preparation of normal butyl amine from normal butyl alcohol and ammonia. Normal butyl alcohol of either chemically pure or commercial quality, is mixed with a small amount of catalyst, for example, from about ¼% to 5% by weight of the alcohol. Sabatier on catalysis, and other publications, mention a number of catalysts useful in amine production. Also dehydration, or hydrogenation catalysts such as metals of the eighth group of the periodic system, may be used.

Hence, various catalysts may be employed which will produce the amination of alcohol by means of ammonia. For example, dehydration catalysts such as various oxides and the like may be added to the alcohol and the mixture agitated so that the catalyst becomes suspended in the alcohol. In the example under consideration a catalyst comprising approximately 1% of nickel obtained from a nickel alloy was suspended in substantially anhydrous butyl alcohol.

I may also refer to any of the aforementioned catalysts as amination catalyst.

A regulated amount of this butyl alcohol-catalyst mixture was caused to flow from tank 2 through conduit 8 into heat exchanger 9. The heated mixture from 9 then passed through conduit 12 and into the reaction chamber 11 through distributor 14. In the heat exchanger 9 the alcohol-catalyst mixture may be heated to a temperature range of from 150° to 250° C.

Reaction chamber 11 contains an atmosphere of ammonia under relatively high pressure and temperature. For example, an ammonia pressure of from 500 to 1000 pounds may be maintained in reaction chamber 11 by means of filling pressure cylinder 17 with ammonia and applying heat thereto by means of circulating steam in temperature jacket 18. By regulating steam pressure in the jacket, uniform ammonia pressure is readily obtained in reaction chamber 11.

It is to be noted that the total pressure on the system at any given temperature will be the sum of the saturated vapor pressures of butyl alcohol and butyl amine at the given temperature, plus the saturated vapor pressure of the ammonia at the temperature maintained in the cylinder. I have found that a favorable reaction chamber temperature for the production of butyl amine is approximately 200° to 220° C. At this temperature, the temperature of the liquid ammonia is much lower than the reaction temperature.

The reaction chamber 11 is provided with means for controlling the temperature thereof, as for example, the temperature controlling jacket 13. By circulating steam in this jacket the temperature of the reaction chamber may be readily maintained around 200–220° C. By means of my novel procedure I find that the following reactions readily take place in the reaction chamber:

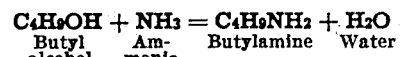
$$C_4H_9OH + NH_3 = C_4H_9NH_2 + H_2O$$
Butyl       Am-        Butylamine   Water
alcohol    monia

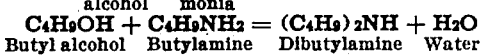
$$C_4H_9OH + C_4H_9NH_2 = (C_4H_9)_2NH + H_2O$$
Butyl alcohol   Butylamine   Dibutylamine   Water The first mentioned reaction producing butyl amine predominates and satisfactory conversions of the alcohol to the primary amine are readily obtainable.

It is to be noted in the above equations that an excess of ammonia favors the formation of the mono-butylamine over the dibutylamine. The high ratio of primary to secondary amine, which is obtained by the application of the process herein disclosed, may be largely due to the fact that there is quite an excess of ammonia.

The liquid cooling in the bottom of reaction chamber 11 contains substantial amounts of normal butylamine and dibutylamine. This liquid may be continuously or intermittently removed from the reaction chamber through valved conduit 21 and the liquid trap 22, 23 and is finally conducted through conduit 26, 27 to a cooler 28. The amines produced may also contain some ammonia.

This mixture of butyl amine, dibutylamine, ammonia and any other components is passed to feed tank 32. Any catalyst contained in the mixture may be removed at 31 by means of filtering, centrifuging, decantation or other suitable treatment. Material from tank 32 is then conducted to column 33 where ammonia may be flashed off from the other components. The ammonia will leave the top of column 33 through conduit 34 and may carry with it amines, water and other components. These vapors pass into condenser 37 where substantially all of the components other than ammonia, such as butyl amine and the like, will be condensed and returned to column 33 through conduit 41. Ammonia vapors will then flow through condenser 38, which is operated at a lower temperature than 37, where any condensables still contained in the ammonia will be thrown down and returned to the column through conduit 39.

The ammonia gas having now had removed from it any amine and other components, may be passed through conduit 43 to compressor 4, conduit 46 and cooler 47, whereby the ammonia is liquefied and stored in the cylinder for re-use in the process.

The amines may be drawn off from the base of column 33 to conduit 49 and may be cooled if desired, at 51 and then passed to storage, refining or other use.

My new process for the manufacture of amines possesses a number of advantages. For example, one advantage of the process is that it may be operated in a continuous manner which is very desirable in a high pressure reaction system. Another advantage is that the amount of other amines formed besides the desired primary butyl amine is extremely small, because the ammonia is always present in material excess by virtue of my procedure. Secondary butyl amine is formed by slower reaction than is primary butyl amine; hence, when the operation is carried out in accordance with my invention, the percentage of dibutyl amine is quite small. By my procedure, excellent reaction contact is obtained by dispersing the liquid phase in either the form of fine droplets or thin films in an atmosphere of the gas with which the liquid is to react. This procedure is superior to high-speed stirring and is without the attendant disadvantages of high speed stirring, inasmuch as there are no packing glands to give trouble in the heated high-pressure part of the system.

For the purposes of illustration, I have set forth my invention in considerable detail with respect to the manufacture of butyl amine. My process is particularly adaptable to the manufacture of the aliphatic amines, such as butyl amine, where various other reaction products are possible because my procedure reduces the quantity of secondary and other undesired products produced. While I have described reactions carried out with butyl alcohol, other materials capable of amination may be substituted for butyl alcohol. For example, dibutyl amine may be substituted for butyl alcohol in the production of primary butyl amine. Or, butyraldehyde may be employed, in which event hydrogen would be supplied to reaction chamber 11 from a pressure chamber containing hydrogen operated in a manner similar and in addition to chamber 17. My process may also be carried out for the production of amyl amines. In this event, amyl alcohol, aldehyde or the like, would be substituted in my process for producing butyl amine. Likewise, other amines such as propyl, ethyl and the like may be prepared.

While in the above example I have set forth certain temperatures, these temperatures may be varied and in the preparation of other amines suitable temperatures and pressures for their preparation would be employed. It will be noted, however, that in carrying out my novel reaction I prefer to employ moderately high pressures and temperatures. The material to be aminated is maintained in the liquid phase and due regard is had for conditions and of the critical temperature of ammonia, 133° C., if that is the aminating agent being used, so that an atmosphere of aminating agent may be maintained. Ammonia, either C. P. or of commercially available quality, has been described for an aminating agent as it is generally readily obtainable. However, other materials containing nitrogen-hydrogen may be employed such as, for example, amines.

From the foregoing it is apparent that various changes may be made in my novel process without departing from the spirit or scope of this invention. Therefore, my invention is not to be restricted except insofar as necessitated by the prior art and the spirit of the appended claims.

What I claim and desire to secure by Letters Patent of the United States is:

1. A method for the catalytic manufacture of primary and secondary amines free from tertiary amines, which comprises spraying a lower aliphatic alcohol having an amination catalyst suspended therein into an atmosphere of ammonia maintained under a pressure of between 200–1500 lbs. per square inch and at a temperature of between 200° C.–250° C., so that reaction between the alcohol and ammonia takes place.

2. In the process for the manufacture of lower aliphatic amines free from tertiary amines by the catalytic reaction of lower aliphatic monohydric alcohols with an amination agent from the group consisting of ammonia and lower aliphatic amines, the steps which comprise dispersing said alcohol mixed with an amination catalyst into an atmosphere of said agent and reacting the alcohol with the agent and in the presence of said catalyst under a pressure between 200–1500 lbs. per square inch and at a temperature between 135° C.–500° C.

3. A continuous process for the production of butyl amine which comprises preparing substantially anhydrous butyl alcohol having suspended therein a metal catalyst from the eighth group of the periodic system, spraying this alcohol mixture in the liquid condition into an atmosphere of ammonia maintained at a temperature above the critical temperature of ammonia but below 300° C., withdrawing a liquid containing amine from the reaction, subjecting the liquid during withdrawal to a temperature in excess of the condensation point of ammonia for reducing the loss of ammonia and then subjecting the amine liquid to cooling.

4. In the process for the manufacture of lower aliphatic primary and secondary amines by the catalytic reaction of a lower aliphatic monohydric alcohol with ammonia, under pressure between 600–1200 lbs. per square inch and at a temperature of between 200–300° C., the step which comprises spraying and reacting said alcohol in the presence of an amination catalyst and in an atmosphere of the ammonia.

5. In the process for the manufacture of lower aliphatic primary and secondary amines by the reaction of ammonia with an aliphatic monohydric alcohol having an amination catalyst mixed therewith, the steps which comprise dispersing and reacting said alcohol having the catalyst therein, in an atmosphere of ammonia and maintaining the reaction at a pressure between 600–1200 lbs. per square inch and at a temperature between 200–300° C.

6. A method of manufacturing amines other than tertiary amines, which comprises dispersing fine droplets of a lower aliphatic alcohol capable of being aminated, in an atmosphere of ammonia maintained at a temperature between 200–250° C., under a pressure between 600–1500 lbs. per square inch, and in the presence of an amination catalyst.

7. A method for the manufacture of amines, which comprises dispersing a lower aliphatic alcohol in the form of thin films in an atmosphere of ammonia and in the presence of an amination catalyst, maintaining the ammonia at a temperature between 135° C.–500° C. and at a pressure between 600–1500 lbs. per square inch, whereby amines are formed and withdrawing at least a part of the amines from the reaction.

8. In the process for the manufacture of primary and secondary amyl amines by the catalytic reaction of amyl alcohol with an amination agent from the group consisting of ammonia and lower aliphatic amines, under a pressure between 200–1500 lbs. per square inch and at a temperature between 135°–500° C., the steps which comprise spraying and reacting said amyl alcohol in an atmosphere of the ammonia and in the presence of an amination catalyst.

9. In the process for the manufacture of lower aliphatic amines by the catalytic reaction of an alcohol from the group consisting of propyl, butyl and amyl alcohols, with ammonia, under a pressure between 200–1500 lbs. per square inch and at a temperature between 135° C.–500° C., the steps which comprise spraying and reacting said alcohol in an atmosphere of the ammonia.

RUDOLPH LEONARD HASCHE.